United States Patent [19]

Krone-Schmidt et al.

[11] Patent Number: 5,316,560
[45] Date of Patent: May 31, 1994

[54] ENVIRONMENT CONTROL APPARATUS

[75] Inventors: Wilfried Krone-Schmidt, Fullerton, Calif.; James R. Markle, Palm Harbor, Fla.

[73] Assignee: Hughes Aircraft Company, Los Angeles, Calif.

[21] Appl. No.: 33,906

[22] Filed: Mar. 19, 1993

[51] Int. Cl.$^5$ .................. B01D 50/00; B01D 46/00
[52] U.S. Cl. .................... 55/385.2; 55/473; 96/57; 422/124
[58] Field of Search ............ 55/385.2, 472, 500, 55/473; 95/58; 422/4, 5, 121, 122, 124, 295, 297; 494/50, 184; 96/57

[56] References Cited

U.S. PATENT DOCUMENTS

| | | | |
|---|---|---|---|
| 3,117,832 | 1/1964 | Thomas | 422/24 X |
| 3,708,963 | 1/1973 | Boonstra et al. | 55/385.2 X |
| 4,253,852 | 3/1981 | Adams | 96/58 |
| 4,549,472 | 10/1985 | Endo et al. | 55/385.2 X |
| 5,083,558 | 1/1992 | Thomas et al. | 55/385.2 X |
| 5,169,418 | 12/1992 | Honda et al. | 55/385.2 X |

OTHER PUBLICATIONS

"Laminar Flow Dri-Lab System," Vacuum Atmospheres Company.

*Primary Examiner*—Robert J. Warden
*Assistant Examiner*—T. A. Trembley
*Attorney, Agent, or Firm*—M. E. Lachman; M. W. Sales; W. K. Denson-Low

[57] ABSTRACT

An apparatus for controlling the environment of an enclosed space is disclosed. The apparatus includes a workspace compartment within a gas-tight chamber, a mechanism for circulating dehumidified gas in true laminar flow through the workspace compartment, and a highly efficient filtering component for removing contaminants from the gas.

5 Claims, 2 Drawing Sheets

ENVIRONMENT CONTROL APPARATUS

This invention was made with support provided by the United States Government under Contract No. N00030-92-C-0007 awarded by the Department of the Navy. The U.S. Government has certain rights to this invention.

BACKGROUND OF THE INVENTION

1. Field of the Invention

The present invention relates generally to apparatus for controlling the environment of an enclosed space. More particularly, the present invention relates to apparatus for controlling and monitoring the cleanliness and humidity of a workspace for manipulating sensitive materials and articles.

2. Description of Related Art

Industrial processes such as fabrication, assembly, cleaning and packaging have increasingly required greater and more precise control over the environments in which they are conducted. Many laboratory functions as well achieve more satisfactory results when ambient conditions can be closely specified, enhancing reproducibility of experimentation along with such other advantages as freedom from contamination.

Environmental chambers in which the enclosed space is, for example, dehumidified, are well known to the manufacturing and scientific communities. Such chambers may take the form of a free standing upright structure called a "dry box" or "glove box", wherein sensitive materials or articles can be manipulated within a volume sealed off from the atmosphere. Conventional dry boxes, however, are extremely dirty, since particles generated therein are not removed as they form.

Another widely utilized workspace environment control is the so-called "clean room", a part of a building in which airborne contamination is controlled to a far higher degree than in conventionally air-conditioned spaces. Clean rooms are traditionally large enclosures set apart from the rest of the building by floor-to-ceiling partitions. The quality of a clean room is expressed by a class number, which number represents the maximum number of particles 0.5 micron in length or larger per cubic foot of air space. The number of such particles present in an ordinary clean room, hence the class number thereof, is on the order of 100,000. By way of contrast, outside unfiltered air may contain such particles in excess of 600,000,000 per cubic foot. Clearly, the smaller the class number, the cleaner the room; a class number of 10,000 is not uncommon. Even a conventional clean room must be tightly fitted with non-porous, easy to clean surfaces having low particle shedding properties and should have floors with a minimum practical number of joints. The internal pressure of a clean room is maintained above that of surrounding areas to insure outward leakage. An exceptional clean room of Class 100 or even Class 10, which may be required for certain manipulations of sensitive articles, for example, jet spray cleaning thereof, is rare, since setting up such a room is difficult and maintaining it extremely expensive.

Conventional jet spray cleaning operations have consumed large quantities of chlorofluorocarbons (CFC's), compounds whose use is increasingly discouraged by the Federal Environmental Protection Agency. A desirable improvement over old technology would allow the use of manual spray guns and a clean dry box, significantly reducing CFC consumption and waste.

Accordingly it is an object of this invention to provide an environmental control apparatus to ensure that articles and sensitive materials may be manipulated under any desired conditions of humidity and cleanliness.

Another object of this invention is to provide control of airborne contamination in a workspace environment to such an extent that such space has a class number on the order of 10 or smaller, at much less cost of installation and maintenance than that of previously available clean rooms.

A still further object is to provide a combination of workspace conditions and operational equipment that will result in a substantial reduction in the use of environmentally disfavored chemical compounds.

SUMMARY OF THE INVENTION

In accordance with the present invention, a structural assembly is provided for inexpensively controlling the conditions of a workspace in which operations requiring an exceptionally clean and dry environment are performed. The cleaning of precision parts and materials, for example, requires a room as free from dusts (particles larger than 10.0 microns) and clouds (0.1–10 microns) as are the finally cleaned parts themselves. In addition, jet spray cleaning and other operations must be performed in a space sufficiently dehumidified to prevent condensation.

The present invention provides conditions of minimal water vapor content, on the order of 20 parts per million by volume within the workspace. At the same time, the present invention provides a clean room condition of 10 or fewer standard particles (0.5 micron or larger) per cubic foot of gas, and achieves both dryness and cleanliness standards in a more cost efficient and pollution-free manner than was previously known.

Mechanically, the structure consists of a gas-tight chamber within which is a smaller compartment functioning as a workspace. The chamber surrounds the workspace compartment on three sides and serves as a gas duct and space for a device that circulates the gas through the workspace and duct.

Gas that has been sufficiently dehumidified is introduced under pressure into the workspace compartment so that previously present atmosphere is exhausted from the workspace and communicating chamber spaces. The gas can be an inert gas such as nitrogen or argon or, in some cases, dehumidified air. As the entire chamber is being filled with the dry gas, the gas is circulated from its inlet through a filtering assembly, through the workspace compartment, along the duct adjacent to the workspace compartment, and back to the gas circulating device.

A beneficial aspect of the workspace compartment of this invention is the accomplishment of laminar flow of the dry gas within the workspace compartment. In general, fluid flow is said to be laminar when its velocities are free of significant fluctuations, as opposed to fluctuating flow, also known as turbulence. Turbulence tends to interfere with manipulation of sensitive articles, such as delicate workpieces, and serves to inhibit efficient removal of contaminating particles from the gaseous environment. The present invention achieves laminar flow of gas through the workspace compartment by providing a filter which forms one wall of the workspace compartment and which serves as the intake for the dry gas, while the entire opposite wall comprises a perforated wall which serves as the gas outlet.

During the circulating process, the particles present in the dry gas are removed by the filter, which is preferably a high efficiency particulate air (HEPA) filter. In addition to the HEPA filter, an ionizing bar may be included in the dry gas path to prevent particulate matter from adhering to surfaces by means of electrostatic attraction.

An airlock and door combination are mounted to an exterior wall of the apparatus, providing entry to the workspace compartment for workpieces and various devices such as tools or instruments without the loss of internal gas pressure.

Manipulating of articles within the workspace compartment is accomplished by means of flexible sleeves in glove ports attached to the surface of an exterior wall of the apparatus or by means of mechanical arms which are remotely controlled. A viewing window allows observation of the interior of the workspace compartment, and is situated preferably close enough to the glove ports or mechanical arms to permit simultaneous viewing and manipulation of articles. In a preferred embodiment the glove ports are situated in the viewing window itself.

The above-discussed and many other features and attendant advantages of the present invention will become better understood by reference to the following detailed description of the preferred embodiments when taken in conjunction with the accompanying drawings.

DESCRIPTION OF THE PREFERRED EMBODIMENTS

Figure 1:
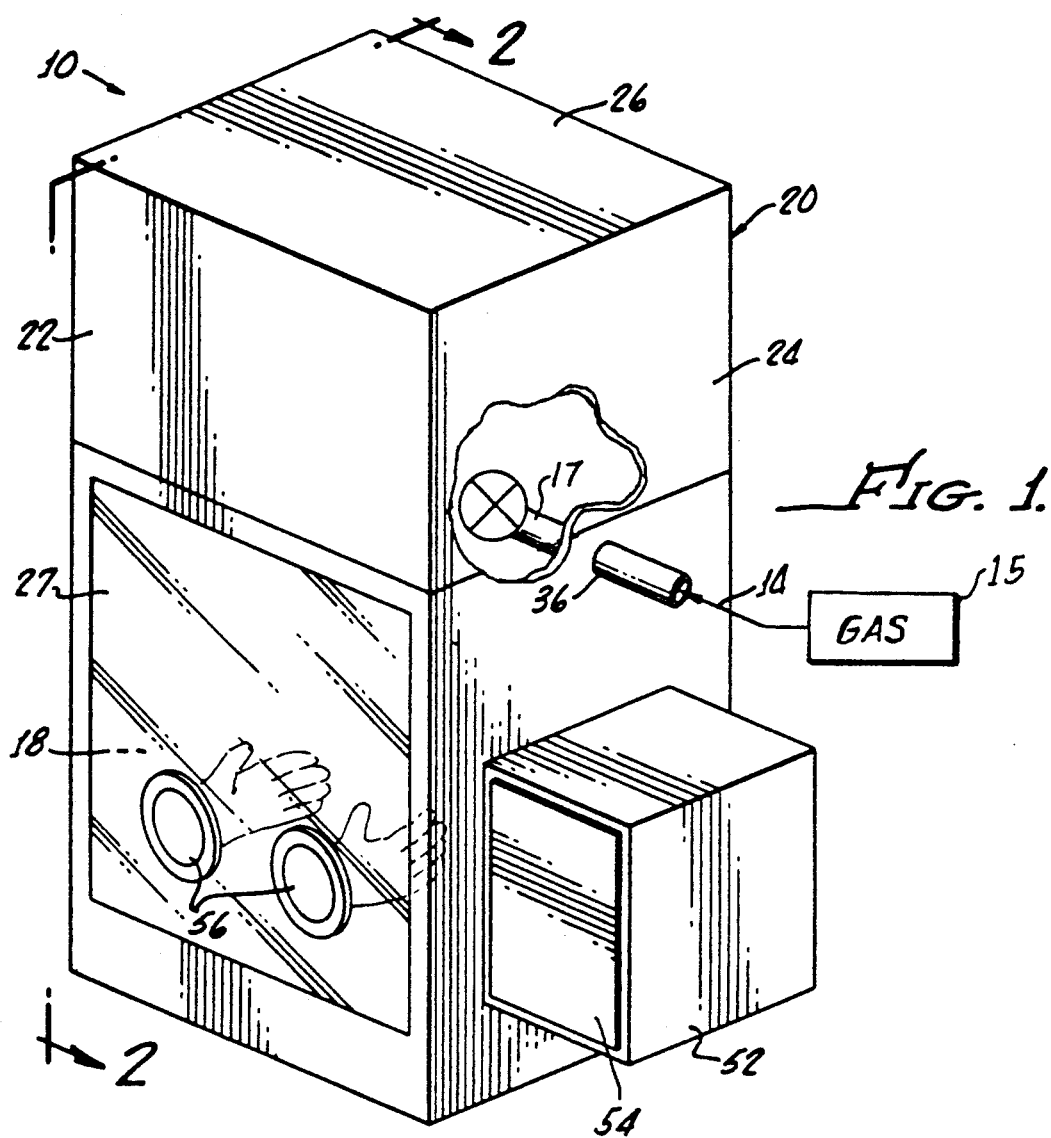
FIG. 1 is an isometric view of an environment control apparatus embodying the present invention.

A preferred exemplary environment control apparatus in accordance with the present invention is shown generally at 10 in FIG. 1. Apparatus 10 includes a chamber 12 (FIG. 2) through which a clean, dehumidified (dry) gas 14, whose flow is denoted by arrows 16, is circulated. Such circulation provides a controlled environment in which various procedures involving, for example, handling, treating, and cleaning can be performed on a variety of workpieces within a workspace compartment 18 of chamber 12. These procedures can be accomplished on delicate hardware, semiconductor devices, and other sensitive equipment by such operating instrumentation as jet spray guns or power sprayers which can also be accommodated within workspace 18. Gas 14 is provided from external gas source 15 through inlet valve 17.

Apparatus 10 includes rigid frame 20 formed of a plurality of exterior walls, three of which are illustrated in FIG. 1 by reference numerals 22, 24, and 26. Exterior wall 24 in this embodiment is a planar vertical wall, while wall 26 is a horizontal top wall. Wall 22 is shown with breaks defining a means for viewing shown in FIG. 1 as window 27. If desired, window 27 may be slightly slanted to facilitate viewing. Any slant, however, should preferably be held to a minimum to preserve laminar flow of gas 14 within workspace compartment 18 and to minimize the formation of eddy currents in the flow of gas within workspace 18. Exterior walls 22, 24, and 26 provide a gas tight seal for the chamber 12 enclosed by frame 20. Walls 22 and 24 are substantially vertical. However, their orientation may vary from the vertical if desired.

Figure 4:
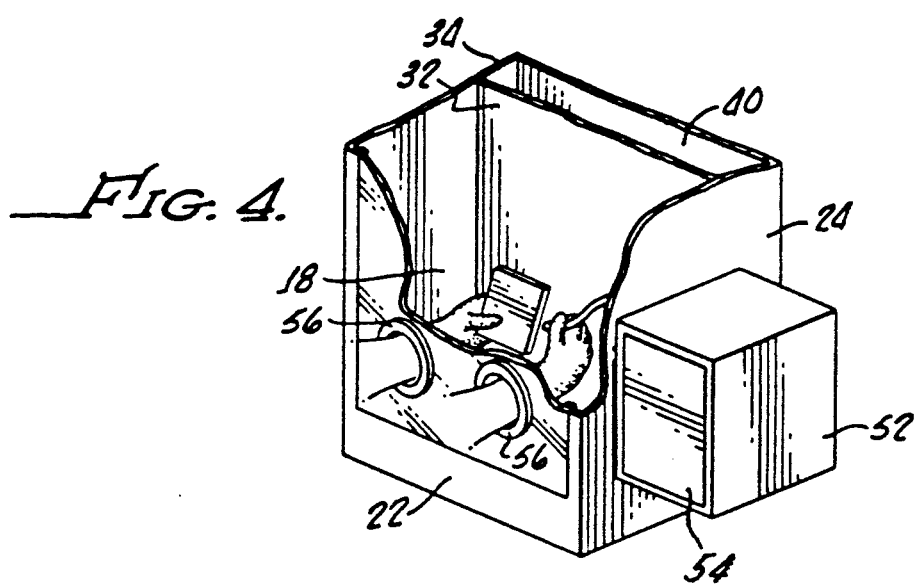
FIG. 4 is a fragmentary view of a workspace compartment embodying the present invention.

Before operations within workspace compartment 18 commence, whatever water-bearing atmosphere exists within chamber 12 is replaced by a means for purging such atmosphere. In this embodiment, an external supply of dry gas 14 is introduced through inlet 36 in exterior wall 24 providing dry gas access to the interior of workspace 18. As is known in the art, clean room pressure should be greater than that of surrounding areas to insure outward leakage. Accordingly, elevated internal pressure is maintained within the clean compartment configuration of the present invention. As dry gas 14 under pressure enters workspace 18, previously present air is expelled gradually through exhaust valve 38 located in exterior wall 34 which forms a part of chamber 12, of which workspace 18 is a communicating compartment, as shown in FIG. 4.

Figure 2:
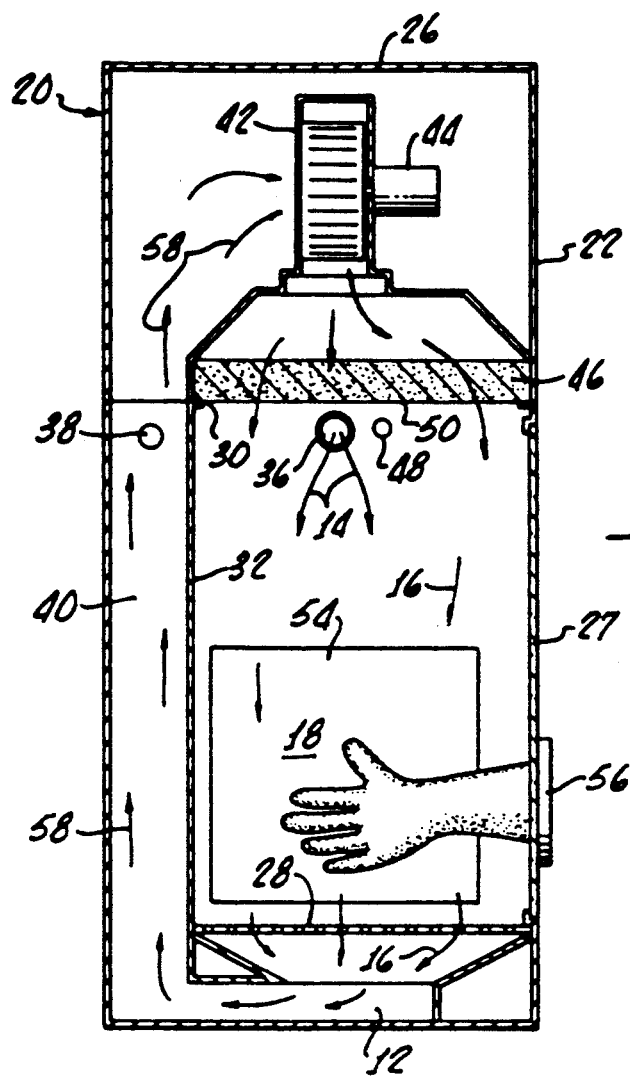
FIG. 2 is a section view taken along lines 2—2 of FIG. 1.
Figure 3:
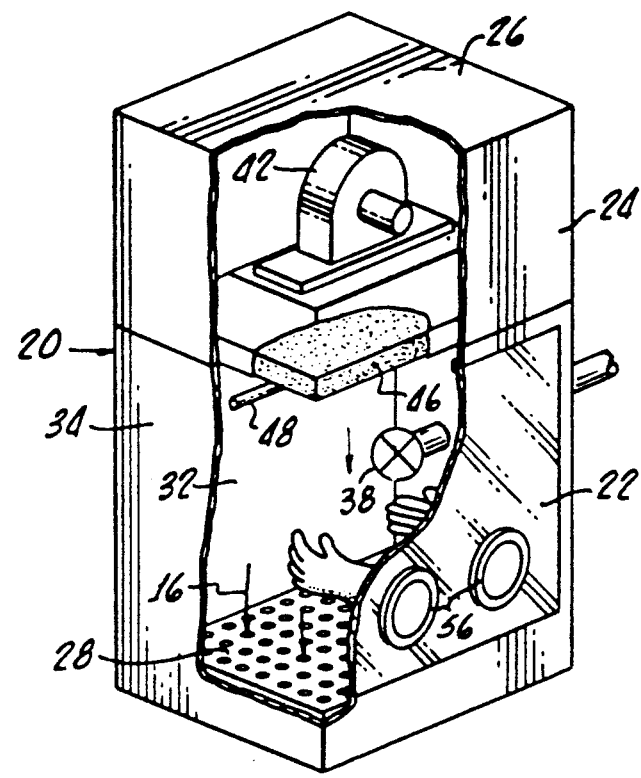
FIG. 3 is an isometric view with frame portions cut away to better show details of interior construction.

Interior walls defining workspace compartment 18 are denoted by reference numerals 28, 30, and 32 in FIG. 2. To produce true laminar flow of gas 14 it is necessary that one entire wall of workspace compartment 18 comprise the gas intake and the entire opposing wall comprise the gas outlet. As shown more clearly in FIG. 2, interior wall 28, a perforated plane, functions as the outlet surface for gas 14, interior wall 30 forms the intake wall, and interior wall 32 connects walls 28 and 30 to form three of the walls enclosing workspace compartment 18. Referring to FIG. 3, the remaining walls of workspace 18 may be seen as contiguous to or identical with portions of exterior walls 22, 24, and 34. All interior surfaces of chamber 12 including workspace 18 are preferably of non-porous material having low particle shedding properties such as, for example, polypropylene.

While vertical flow is illustrated in this embodiment, laminar flow may also be achieved by a horizontal orientation of workspace 18, so long as the gas intake and outlet surfaces 30 and 28, respectively, occupy their respective entire walls.

True laminar flow of gas 14 is superior to those flow patterns that would be produced by intake and outlet surfaces that comprise less than whole surfaces of the workspace 18. Laminar flow results in both more efficient removal of particles from gas 14 and less turbulence to interfere with delicate workpiece manipulation. Laminar flow is achieved in the present invention by a circulating means which draws a continuous supply of dehumidified gas from outside the workspace and forces its flow in a smooth manner through an inlet surface, over the workpiece, through an outlet surface, and back to a blower mechanism, driving the gas once more to the inlet of the workspace. Preferably, velocity of the gas throughout the cycle is kept to the range of 90–150 linear feet per minute.

In this embodiment, a blower 42 driven by a motor 44 propels dry gas 14 already within compartment 12 in the direction shown by arrows 58 upward through a duct portion 40 of compartment 12 and into the HEPA filter 46. Gas flow continues downward through workspace 18 in a laminar manner and exits through perforated floor 28. It will be appreciated that motor 44 need not be located within the confines of chamber 12 but may be located exterior to frame 20, driving blower 42 through a transmission means.

As gas 14 is circulated through chamber 12 to provide the desired dry box conditions for workspace 18, gas 14 is continually cleansed of contaminating particles by a filtering means to achieve the clean dry box goals of this invention. As shown in FIG. 2, filter 46 is situated so that its perimeter is coterminous with the boundaries of interior wall 30 of workspace 18 to form the entire gas inlet surface of the workspace. Filter 46, which is preferably a high efficiency particulate air (HEPA) filter is capable of producing an exceptional clean room class rating on the order of 10 particles of 0.5 micron length per cubic foot of gas or less. An ionizing bar 48 is located adjacent to and parallel with face 50 of filter 46.

To position a workpiece upon the work surface formed by perforated floor 28 within workspace 18, a means for emplacing and withdrawing workpieces is employed to communicate with the exterior of the apparatus without breaking the gas-tight integrity of the chamber 12. For this purpose an air lock 52 and a door 54 are sealably fixed to the exterior of wall 24 to allow passage of items in and out of workspace 18 without requiring decompression of chamber 12.

When workpieces and instrumentation are in place within the workspace and clean, dry gas is being circulated throughout the chamber, some means for accessing the workspace to manipulate the workpieces and tools is necessary, but such means must again preserve the integrity of the entire chamber. FIG. shows glove ports 56 including flexible sleeves with glove-like closures projecting inside workspace 18 and sealed where they join the surface of window 27. The location and number of glove ports 56 is not critical. There may be, for example, three glove ports situated in window 27 and one on a side wall 34 or 24. Similarly, an access door (not shown) may be installed in non-interference with such a glove port 56 on side wall 34 to provide unpressurized access to workspace 18.

Finally, a means for viewing the operations performed within the workspace is provided. While this means for observing may take a variety of forms including remote electronic surveillance, the present embodiment employs a viewing window 27 situated as shown in FIG. 1 and including glove ports 56. Window 27 and door 54 may be fabricated of transparent material such as, for example, a polycarbonate.

While an inert gas such as nitrogen or argon can be used advantageously in this embodiment, those of ordinary skill in the pertinent art will recognize that other gases, including atmospheric air may be employed if sufficiently dried prior to introduction into the apparatus of this invention. Further, water content levels that are below the 20 parts per million by volume achieved by this embodiment are attainable with the addition of drying agents to the present system. Other applications of the present invention include soaking of component parts in a beneficial gas for processing, or sealing of parts in an inert gas for shipping. An additional benefit of utilizing a purge gas that effectively removes oxygen from the workspace is the halting of oxidation, thereby avoiding corrosion of sensitive surfaces.

The depiction of the present invention by reference to a single exemplary embodiment is not intended to imply a limitation on the invention, which is limited only by the spirit and scope of the appended claims.

We claim:

1. An apparatus for controlling at least the cleanliness and humidity of a dehumidified gas within a sealable chamber configured to accommodate a workpiece and associated instrumentation, said apparatus comprising:

a sealable chamber comprising a frame defined by vertical exterior walls forming a generally rectangular parallelopiped having at least one set of its horizontal edges mutually joined by a horizontal wall;

an internal structure comprised of interior walls defining an enclosed workspace and nested within said frame such that a pair of mutually opposed horizontal interior walls having one set of opposed edges connected by one vertical interior wall are spaced apart from said vertical exterior walls to form, in combination with both opposing and contiguous internal surfaces of said vertical exterior walls, a duct enclosed by said interior walls and surrounding the exterior of said enclosed workspace on three sides;

an HEPA filter constituting the upper one of said pair of mutually opposed horizontal interior walls, said HEPA filter having an outlet side adjacent said enclosed workspace and an inlet side;

a perforated floor constituting the lower one of said pair of horizontal interior walls;

a blower disposed within the sealable chamber on said inlet side of said HEPA filter and external to said workspace, positioned for circulating a dehumidified gas through said HEPA filter, thence in laminar flow through said enclosed workspace, thence out of said enclosed workspace through said perforated floor, thence along said duct and back to said blower;

purge means comprising an inlet valve disposed within said enclosed workspace communicating with an external source of the dehumidified gas, and an exhaust valve disposed within the sealable chamber through which water vapor-bearing atmosphere is expelled from said frame;

an airlock and door sealably communicating between said enclosed workspace and the exterior of said frame for emplacing and withdrawing a workpiece into and from said enclosed workspace;

at least one glove port communicating between said enclosed workspace and the exterior of said frame, and configured to sealably accommodate an arm and hand of an operator for permitting manipulation of said workpiece and instrumentation within said enclosed workspace; and a transparent window interposed between said enclosed workspace and the exterior of said frame for permitting observation of the interior of said enclosed workspace by an operator employing said at least one glove port.

2. The apparatus of claim 1 further comprising an ionizing bar disposed within said enclosed workspace adjacent and parallel to said HEPA filter.

3. The apparatus of claim 1 wherein said dehumidified gas is nitrogen.

4. The apparatus of claim 1 wherein said interior walls other than said filter wall are fabricated from polypropylene.

5. The apparatus of claim 1 wherein said transparent window and door are fabricated from polycarbonate.

* * * * *

UNITED STATES PATENT AND TRADEMARK OFFICE
CERTIFICATE OF CORRECTION

PATENT NO. : 5,316,560
DATED : May 31, 1994
INVENTOR(S) : Wilfried Krone-Schmidt and James R. Markle It is certified that error appears in the above-indentified patent and that said Letters Patent is hereby corrected as shown below:

On the title page, item [73] add --Honeywell, Inc., Minneapolis, Minnesota--.

Signed and Sealed this

Twenty-seventh Day of December, 1994

Attest:

BRUCE LEHMAN

Attesting Officer  Commissioner of Patents and Trademarks